(12) United States Patent
Hansen et al.

(10) Patent No.: US 9,907,431 B2
(45) Date of Patent: Mar. 6, 2018

(54) BEVERAGE PREPARATION MACHINES

(71) Applicant: Kraft Foods R&D, Inc., Deerfield, IL (US)

(72) Inventors: Nicholas Hansen, Banbury (GB); Mark Norton, Banbury (GB)

(73) Assignee: Koninklijke Douwe Egberts B.V., Utrecht (NL)

(*) Notice: Subject to any disclaimer, the term of this patent is extended or adjusted under 35 U.S.C. 154(b) by 319 days.

(21) Appl. No.: 14/421,133

(22) PCT Filed: Jul. 18, 2013

(86) PCT No.: PCT/IB2013/001661
§ 371 (c)(1),
(2) Date: Feb. 11, 2015

(87) PCT Pub. No.: WO2014/027235
PCT Pub. Date: Feb. 20, 2014

(65) Prior Publication Data
US 2015/0238045 A1 Aug. 27, 2015

(30) Foreign Application Priority Data
Aug. 13, 2012 (GB) .................................. 1214433.3

(51) Int. Cl.
*A47J 31/46* (2006.01)
*A47J 31/60* (2006.01)
(Continued)

(52) U.S. Cl.
CPC ............. *A47J 31/46* (2013.01); *A47J 31/369* (2013.01); *A47J 31/407* (2013.01); *A47J 31/60* (2013.01)

(58) Field of Classification Search
CPC ......... A47J 31/46; A47J 31/60; A47J 31/407; A47J 31/369
See application file for complete search history.

(56) References Cited

U.S. PATENT DOCUMENTS 2,132,333 A * 10/1938 Sargent ................. B05B 1/1654
239/394
2,437,025 A * 3/1948 Hatten ................... B23K 7/007
266/54
(Continued)

FOREIGN PATENT DOCUMENTS

CN 200987610 Y 12/2007
CN 101641039 A 2/2011
(Continued)

OTHER PUBLICATIONS

Search Report and Office Action for Russian Patent Applicatioin No. 2015107035, with English translation.
(Continued)

*Primary Examiner* — Sean Michalski
(74) *Attorney, Agent, or Firm* — Fitch, Even, Tabin & Flannery LLP

(57) ABSTRACT

A beverage preparation machine configured to dispense a beverage through an outlet nozzle assembly, the machine comprising: an outlet nozzle assembly having provided therethrough a first outlet and a second outlet; and one or more conduits arranged to deliver selectably fluid to the first outlet or the second outlet.

24 Claims, 10 Drawing Sheets

(51) Int. Cl.
*A47J 31/36* (2006.01)
*A47J 31/40* (2006.01)

(56) References Cited

U.S. PATENT DOCUMENTS

| | | | | |
|---|---|---|---|---|
| 2,485,723 | A * | 10/1949 | Fitzgerald | A62C 3/0207 137/625.11 |
| 3,479,949 | A * | 11/1969 | Reynolds | A47J 31/10 239/553.3 |
| 3,517,859 | A * | 6/1970 | Miller | A47J 31/007 222/52 |
| 3,520,247 | A * | 7/1970 | Hester | A47J 31/36 99/283 |
| 4,550,652 | A | 11/1985 | Da Silva | |
| 4,759,634 | A * | 7/1988 | Blom | A47J 31/401 141/279 |
| 4,829,888 | A * | 5/1989 | Webster | A47J 31/4403 99/284 |
| 5,350,082 | A * | 9/1994 | Kiriakides, Jr. | G07F 13/10 221/1 |
| 5,645,222 | A * | 7/1997 | Chih | B05B 1/1654 239/394 |
| 5,826,622 | A | 10/1998 | Piscaer | |
| 6,076,729 | A * | 6/2000 | Cornell | B65D 77/283 220/706 |
| 6,279,329 | B1 * | 8/2001 | Berge | F25C 5/002 406/157 |
| 6,866,208 | B2 * | 3/2005 | Kao | B05B 1/1654 239/390 |
| 7,281,673 | B2 * | 10/2007 | Burnworth | B05B 1/1636 239/392 |
| 7,407,117 | B2 * | 8/2008 | Dodd | B05B 7/2443 222/145.8 |
| 7,673,557 | B2 | 3/2010 | Bienvenu | |
| 2006/0108023 | A1 | 5/2006 | Greiwe et al. | |
| 2006/0283330 | A1 | 12/2006 | Lin | |
| 2007/0000944 | A1 | 1/2007 | Cahen et al. | |
| 2007/0034087 | A1 | 2/2007 | Colman et al. | |
| 2009/0101019 | A1 * | 4/2009 | Coccia | A47J 31/54 99/280 |
| 2009/0293733 | A1 | 12/2009 | Martin et al. | |
| 2012/0199012 | A1 * | 8/2012 | Daburger | F16K 7/063 99/300 |

FOREIGN PATENT DOCUMENTS

| | | |
|---|---|---|
| DE | 3602665 A1 | 8/1987 |
| DE | 3742930 C1 | 10/1988 |
| DE | 19540885 A1 | 5/1996 |
| EP | 0151500 A1 | 8/1985 |
| EP | 0334572 A1 | 9/1989 |
| EP | 0389141 A1 | 9/1990 |
| EP | 1440644 A1 | 7/2004 |
| EP | 1440903 A1 | 7/2004 |
| FR | 2726454 A1 | 5/1996 |
| GB | 2449307 A | 11/2008 |
| JP | 6232494 Y2 | 8/1987 |
| JP | 956595 A | 3/1997 |
| JP | 9075224 A | 3/1997 |
| JP | 3889840 B2 | 3/2007 |
| JP | 200843695 A | 2/2008 |
| JP | 2008531162 A | 8/2008 |
| JP | 2009525056 A | 7/2009 |
| JP | 2011520485 A | 7/2011 |
| WO | 2006014936 A2 | 2/2006 |
| WO | 2007027206 A2 | 3/2007 |
| WO | 2007035877 A2 | 3/2007 |
| WO | 2009138313 A1 | 11/2009 |
| WO | 2011074958 A1 | 6/2011 |
| WO | 2011095511 A1 | 8/2011 |
| WO | 2012072758 A1 | 6/2012 |

OTHER PUBLICATIONS

Search Report for China Patent Application No. 201380042925.6, English translation (1 pg.).
Notification of the First Office Action, dated May 27, 2016 for China Patent Application 201380042925.6, English translation (3 pgs.).
International Search Report, dated Sep. 4, 2013 and Written Opinion for PCT/IB2013/001661 (7 pgs.).
UK Intellectual Property Office Combined Search and Examination Report, dated Dec. 24, 2012 for Application No. 1214433.3 (6 pgs.).
Letter to UK Intellectual Property Office dated Oct. 10, 2014 and Amended Claims for Application No. 1214433.3 (11 pgs.).
UK Intellectual Property Office Notification of Grant, dated Dec. 15, 2014 for Application No. 1214433.3 (2 pgs.).
English translation of Notice of Reasons for Rejection, dated Dec. 3, 2015 for Japanese Patent Application No. 2015-523621 (7 pgs.).

* cited by examiner

BEVERAGE PREPARATION MACHINES

CROSS REFERENCE TO RELATED APPLICATIONS

This application is a U.S. national phase application of International Application No. PCT/IB2013/001661, filed Jul. 18, 2013, which claims benefit from Great Britain Application 1214433.3, filed Aug. 13, 2012, which are hereby incorporated herein by reference in their entirety.

FIELD

The present invention relates to improvements in beverage preparation machines and in particular to a beverage preparation machine of the type which uses pre-packaged containers of beverage ingredients.

BACKGROUND

Coffee houses have been a part of the "coffee culture" since the $17^{th}$ century. Throughout the years methods of making coffee have been refined and skilled people trained to produce the best coffee beverages. The first coffee machines were developed in the early 1800s and an automatic espresso machine was invented in the 1930s. The automation of the coffee making process has, in turn, lead to a rapid growth, particularly in the last ten years, in the number of coffee houses/shops with more specialist drinks, such as espresso and cappuccino, being in high demand. These types of beverages have historically been regarded as luxury items because of the need for expensive, complex machines capable of producing the high pressures necessary for making them, which had to be properly operated and maintained by a trained barista to produce good quality. Coffee aficionados agree that an espresso can be spoiled by a badly trained operator despite the use of a good quality machine and good quality coffee. This trend, however, has not only lead to an increased demand from consumers for luxury top quality beverages, but also a desire for a greater variety of specialty beverages, and the ability to make such beverages in the comfort of one's own home.

Although there is no agreed technical definition, it is generally understood that, compared to drip coffee, barista quality espresso has a thicker consistency, due to a higher amount of dissolved solids and fine oil droplets suspended throughout the drink. It has a smooth, yet thick, dark reddish brown crema making up 10 to 30% of the beverage. The crema is a polyphasic emulsion of air and the oils, proteins and sugars extracted from the coffee which is produced at a high pressure, traditionally in the region of 9 to 10 bar. The higher pressures increase the rate of coffee wetting and improve extraction as well as being responsible for the development of the crema. Air is entrained into the beverage as it is being brewed to produce the desired crema.

It is acknowledged, by discerning espresso drinkers, that espresso produced using water which is cooler than the optimum temperature tastes sour and that produced with water which is hotter than this temperature tastes bitter. The optimum temperature is claimed to be between 92 and 96° C. Other factors which affect the quality of the espresso include the roasting and age of the coffee beans, the grind size, the compaction of the grinds prior to brewing, and the brew time. The "best" espresso is achieved by balancing these key elements of the brewing process.

Domestic coffee machines have also developed significantly since the first filter machines were invented in the 1960s and coffee machines are now essential pieces of kitchen equipment in many households. Some such machines dispense individual servings of a beverage directly into a drinking receptacle, and derive the beverage from a bulk supply of beverage ingredients or from individual packages of beverage ingredients such as pods, pads or cartridges. In the following specification such packages will be referenced by the general term cartridges. Machines that use such cartridges require far less cleaning and can enable the user to make a selection of beverages. The beverages are formed from brewing, mixing, dissolving or suspending the beverage ingredients in water. For example, for coffee beverages, heated water is forced through the cartridge to form the extracted solution. The cartridge may be designed so that air becomes entrained so as to produce a desired foam or crema. The extracted solution passes along a conduit to an outlet nozzle provided at a dispensing station. The dispensing station comprises a stand upon which a receptacle may be supported. The outlet nozzle is positioned above the stand such that the beverage is dispensed through the outlet nozzle and into the receptacle. Cleaning may be performed using a steam purge, i.e. passing steam through the conduit. The use of cartridges in domestic coffee machines has become increasingly popular due to their convenience and the quality of the beverage produced. An example of a machine for preparing beverages using cartridges is described in EP-A-1440644, and examples of cartridges are described in EP-A-1440903.

SUMMARY

With the change in consumer trends, however, there is a desire for domestic machines that are capable of producing barista quality espresso and a range of other beverages, for which no training is necessary, which are affordable and which require little or no cleaning.

As mentioned above, much effort has been directed to ensuring that the coffee produced by such machines is of the highest quality. In particular, attention has been paid to ensure barista quality espressos are produced that have the distinctive crema. Yet it is desired for the beverage preparation machine to be able to dispense other beverages such as "regular" coffee, tea, hot milk and hot chocolate, with the quality of each beverage dispensed being as high as possible.

Against this background, the present invention provides a beverage preparation machine configured to dispense a beverage through an outlet nozzle assembly, the machine comprising an outlet nozzle assembly having provided therethrough a first outlet and a second outlet, and one or more conduits arranged to deliver selectably beverage to the first outlet or the second outlet.

The outlets may be selected from a range of alternatives. One of the outlets will comprise a delivery hole for delivering beverage to a drinking receptacle. As will be described in more detail below, the delivery hole may be paired with a waste outlet, or two delivery holes with different-sized bores may be provided. Also, three outlets corresponding to a pair of delivery holes with differently-sized bores and a waste outlet may be provided.

Providing delivery holes with bores of different sizes allows better quality beverages to be produced. This is because delivery of different beverages require different flow rates and gas/liquid ratios, as well as the liquids having a range of rheological properties. For example, preparing and delivery an espresso is performed at low flow rates (typically between 1 mls$^{-1}$ and 2 mls$^{-1}$) in which case the first delivery hole with the smaller bore is better suited for dispensing the beverage. For other beverages, like tea, chocolate and café crema, the preparation and delivery process is performed at a higher flow rate (typically up to around 5 mls$^{-1}$). For such beverages, the second delivery hole with the larger bore is better suited for dispensing the beverage. The present invention allows a delivery hole to be selected that is better suited to the beverage being prepared.

Providing a separate waste outlet allows waste to be directed away from the beverage dispensing station, for example to be collected in a dedicated waste receptacle. While beverage is delivered to the delivery hole through a conduit, a common or different fluid may be provided to the waste outlet. For example, water or steam may be provided as a purge between beverage dispensing operations. For example, a single conduit may be provided to service all outlets, and a steam purge may be used to clean the conduit after delivery of a beverage.

Multiple conduits may carry the beverage to the outlet nozzle assembly, with a conduit being provided for each outlet. However, it is preferred for a single conduit to be provided that is arranged for selectable delivery of beverage to the first outlet or the second outlet. The outlet nozzle assembly may be arranged to move between a first position in which the first outlet is aligned for delivery of fluid from the conduit and a second position in which the second outlet is aligned for delivery of fluid from the conduit. For example, the outlet nozzle assembly may be provided on a sliding drawer.

Preferably, the conduit is arranged to move between a first position in which an outlet of the conduit is aligned to dispense fluid to the first outlet and a second position in which the outlet of the conduit is aligned to dispense fluid to the second outlet. This may be achieved by making the conduit flexible and providing an actuator arranged to move the outlet of the conduit from one of the first and second positions to the other of the first and second positions. Optionally, the inlet of the conduit is fixed in position. The actuator may be any device capable of moving the flexible conduit, such as a finger or jaw that deflects the conduit. The conduit may be a flexible hose that is fixed at one end (the inlet) and is free to move at its other end (the conduit outlet where beverage is passed to the first and second outlets). The actuator may move the flexible conduit from the first outlet to the second outlet and/or from the second outlet to the first outlet. The actuator may comprise a single device to effect movement both ways, e.g. a jaw to grip the conduit to allow the conduit to be moved towards and away from the second outlet.

In a contemplated embodiment, the conduit is resilient and is arranged to occupy the first or second position in its relaxed state. With such an arrangement, the actuator need only move the conduit away from the relaxed position. For example, if the conduit is arranged to align with the first outlet in its relaxed state, then the actuator need only deflect the conduit to align with the second outlet: simply releasing the conduit will see it return to alignment with the first outlet.

As noted above, one of the outlets of the outlet nozzle assembly may comprise a waste outlet arranged to transfer waste to a waste receptacle. This may be used during a steam purge. For example, the beverage preparation machine may comprise a single conduit arranged to deliver selectably beverage to a first delivery hole, or a second delivery hole if present, or to deliver fluid to the waste outlet. The conduit may be aligned with the waste outlet, and the steam purge operated such that steam passes through the conduit to clean the conduit. The waste will then pass along the waste outlet and may be collected in the waste receptacle. As described above, either the outlet nozzle assembly or the conduit may be moved to cause the conduit and one of the first delivery hole, any second delivery hole and waste outlet to align. Also as described above, an actuator may be used to deflect an outlet of a flexible conduit between alignment for delivery of beverage to the first delivery hole, any second delivery hole and the waste outlet.

The waste outlet may comprise a chute that is optionally arranged to guide the flow of waste down and to the side. The chute may terminate at a hole provided in the base of the chute or in the side of the outlet nozzle assembly. This arrangement allows waste to be directed away from the first delivery hole and any second delivery hole, and takes waste to a waste receptacle. The waste receptacle may be provided within the beverage preparation machine, e.g. within a housing.

The beverage preparation machine may comprise a dispensing station in which the first delivery hole and any second delivery hole are provided above a stand for supporting a drinking receptacle, such as a cup or mug. Where first and second delivery holes are provided, they may be disposed side-by-side, so that either hole is able to dispense beverage into a receptacle placed on the stand.

Where a second delivery hole is provided, it may have a larger bore than the first delivery hole and it may have a plain bore formed through the outlet nozzle assembly. For example, the second delivery hole may be a cylindrical bore.

Advantageously, the first delivery hole may have a smaller bore than the second delivery hole and may have, an enlarged inlet. For example, the first delivery hole may comprise a chamber for collecting fluid, and may have a bore extending from the base of the chamber through the outlet nozzle assembly. Thus, any beverage not delivered precisely enough to pass straight through the bore of the first delivery hole may be collected in the chamber of the first delivery hole. Alternatively, the conduit may be aligned with the chamber part of the first delivery hole and offset from the hole of the first delivery hole such that beverage is dispensed into the chamber. The beverage may then pool and flow to the hole to be dispensed therefrom. The chamber may slope towards the hole to help guide beverage through the hole. A similar arrangement may be employed for the second delivery hole.

Optionally, upstanding walls divide the outlets, for example first and second delivery holes, or a delivery hole and a waste outlet, or first and second delivery holes and a waste outlet. This separation with walls helps prevent cross-contamination of beverages/waste from one outlet to another.

Optionally, the outlet nozzle assembly is removable. This is for ease of cleaning. For example, the outlet nozzle assembly may slide in and out of position, and may be retained by any convenient means.

The present invention also provides a method of dispensing beverages from a beverage preparation machine comprising an outlet nozzle assembly having provided therethrough a first outlet and a second outlet, and one or more conduits arranged to deliver selectably beverage to the first or second outlet. The method comprises: (a) passing fluid through one of the one or more conduits that is aligned for delivering fluid to the first outlet; and (b) passing fluid through one of the one or more conduits that is aligned for delivering fluid to the second outlet.

Optionally, a single conduit dispenses fluid to the first and second outlets, and the method comprises: prior to step (a), ensuring that the conduit is aligned for delivering fluid to the first outlet and, if not, causing relative movement between the first outlet and the conduit to bring the conduit into alignment for delivering fluid to the first outlet; and, prior to step (b), ensuring that the conduit is aligned for delivering fluid to the second outlet and, if not, causing relative movement between the second outlet and the conduit to bring the conduit into alignment for delivering fluid to the second outlet.

Optionally, the first outlet is a first delivery hole and the second outlet is a waste outlet. Then, step (a) may comprise passing beverage through the conduit aligned for delivering beverage to the first delivery hole, thereby causing the beverage to be dispensed from the first delivery hole. Step (b) may then comprise passing fluid through the conduit aligned for delivering fluid to the waste outlet. For example, steam may be passed through the conduit.

Optionally, the first outlet is a first delivery hole and the second outlet is a second delivery hole, wherein the first delivery hole has a smaller bore than the second delivery hole. Then, step (a) may comprise passing beverage through the conduit aligned for delivering beverage to the first delivery hole at a relatively low flow rate, thereby causing the beverage to be dispensed from the first delivery hole. Step (b) may then comprise passing beverage through the conduit aligned for delivering beverage to the second delivery hole at a relatively high flow rate, thereby causing the beverage to be dispensed from the second delivery hole. The outlet nozzle assembly may further comprise a waste outlet, and the method may further comprise passing a fluid through a conduit aligned for delivery to the waste outlet.

Other preferred features of the invention are defined in the appended claims.

BRIEF DESCRIPTION OF THE DRAWINGS

Preferred embodiments of the present invention will now be described, by way of example only, with reference to the accompanying drawings in which.

DETAILED DESCRIPTION

Figure 1:
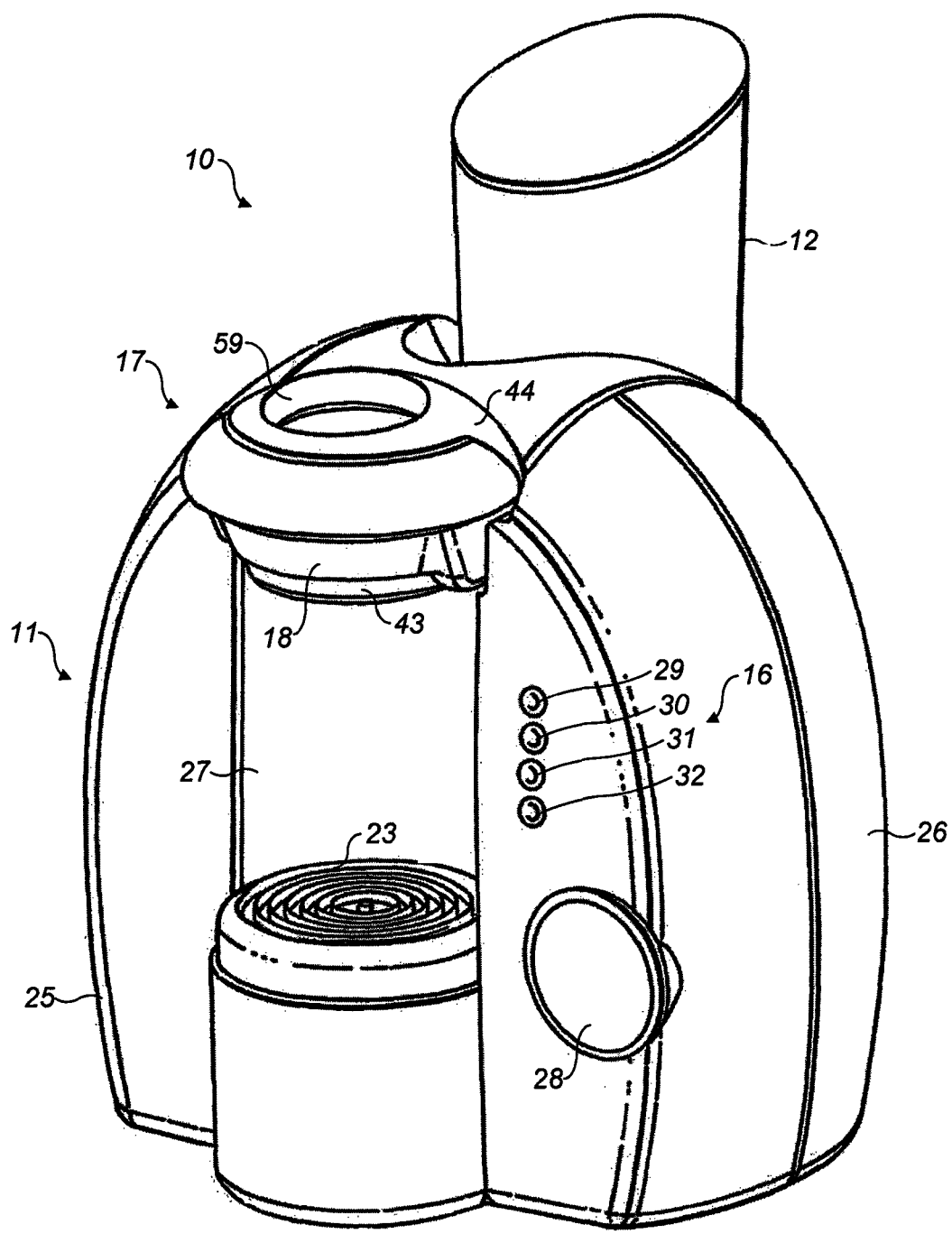
FIG. 1 is a front perspective view of a prior art beverage preparation machine with the cartridge head in a closed position.

In order to cater for the desired wide selection of good-quality beverage types, having different characteristics, the present invention involves one or more significant improvements to known beverage preparation machines. The beverage machine may comprise a soda fountain, beer pump, or the like. The present invention enjoys particular benefit when used with beverage preparation machines for preparing hot beverages like coffee, tea, hot chocolate and hot milk. In particular, the improvements provided by the present invention enable the production of good quality espressos with a high-quality crema, yet provide a design that is easy to keep clean and hygienic, and that is capable of providing other high-quality beverages.

The improvements will be described with reference to a known beverage preparation machine 10 that is illustrated in FIGS. 1 to 7 of the accompanying drawings. It should be noted, however, that the improvements find application in a wide range of beverage preparation machines which may or may not be capable of using a wide range of cartridges which, as noted above, include pods, pads, rigid and semi-rigid cartridges.

The beverage preparation machine 10 of FIGS. 1 to 7 generally comprises a housing 11, a tank 12, a water heater 13, a pump 14, a waste receptacle 9, a control processor (not shown), a user interface 16 and a cartridge head 17. The cartridge head 17 in turn generally comprises a cartridge holder 18 for holding, in use, a beverage cartridge 19 and cartridge recognition means 20. The cartridge head 17 further comprises inlet and outlet piercers 21,22 for forming in the beverage cartridge 19, in use, an inlet for liquid to enter the cartridge 19 and an outlet 70 for the prepared beverage to exit the beverage cartridge 19. Beverage leaving the cartridge 19 through the outlet 70 flows into a conduit 75 and then exits the machine 10 from an outlet nozzle assembly 100.

Although water is likely to be the most common liquid used in preparing beverages such as coffee, the machine 10 is also capable of handling other liquids, such as milk or milk preparations, for mixing with the beverage ingredients. Any references herein to water should also be taken to include any form of liquid used in preparing beverages.

The housing 11 is preferably made in whole or in part from a suitable plastics material or metal. The housing 11 preferably comprises a clam-shell design having a front half 25 and a rear half 26 which allow access during assembly for fitting of the machine 10 components.

The front half 25 of the housing 11 defines a dispensing station 27 where beverage is dispensed through the outlet nozzle assembly 70. The dispensing station 27 includes a cupstand 23 with a drip tray located beneath. The machine user interface 16 is also located on the front of the housing 11 and comprises a plurality of control switches, for example, a start/stop button 28, and a number of status indicators 29-32. The status indicators 29-32 are preferably light emitting diodes (LED) which, for example, indicate readiness of the machine 10, whether an error has occurred in the machine 10 operation, and the mode of operation of the machine 10. The start/stop button 28 controls commencement of a dispense cycle and is preferably a manually operated push-button, switch or similar.

The tank 12 is located to the rear of the housing 11 and is preferably incorporated in, or connected to, the rear half 26 of the housing 11. The tank 12 has an inlet for filling the tank 12 with water, or other liquid, which is closed off when the tank 12 is in position in the machine 10. An outlet is provided towards a lower end of the tank 12 which communicates with the pump 14. The tank 12 may be made from a transparent or translucent material to allow a consumer to view the quantity of water remaining in the tank 12. Alternatively, the tank 12 may be made from an opaque material but have provided a viewing window therein. In addition, or in place of the above, the tank 12 may be provided with a low level sensor which prevents operation of the pump 14 and optionally triggers a warning indicator, such as an LED, when the liquid level in the tank descends to a preselected level.

The pump 14 is operatively connected between the tank 12 and the water heater 13, and is controlled by the control processor. The flow rate of water through the machine 10 can be controlled by the control processor. A volumetric flow sensor (not shown) is preferably provided in the flow line either upstream or downstream of the pump 14.

The heater 13 is located in the interior of the housing 11. The water for the dispense cycle is delivered to the cartridge head 17 at a predetermined temperature. The heater 13 is able to adjust quickly the delivery temperature to the required temperature, generally between 80° C. and 98° C., and possibly higher from the incoming water temperature. The heater 13 comprises an over-temperature cut-off which shuts off the heater 13 if the temperature exceeds 98°. The machine 10 also incorporates a steam purge. The preferred means of generating the steam purge is to utilise a water heater 13 in the form of a flash heater (also known as an instantaneous or flow heater). Typically, such flash heaters comprise a tube through which the water passes wherein the tube is heated by one or more resistive elements. The flash heater can be used not only for heating water for forming beverages but also, at higher power settings, for generating a steam purge by boiling off water remaining with the flash heater tube after the beverage has been formed. An advantage of flash heaters is that there is no significant delay whilst water in a boiler heats up. Flash heaters heat water on demand and switch off immediately after each brewing cycle and are therefore very energy efficient.

Water output from the heater 13 is fed via a suitable delivery system to the cartridge head 17 and cartridge 19 by means of a valve. If the pressure of the water flow is acceptable, the water is passed to the cartridge 19. If the pressure is below or above predetermined limits then the water is diverted by means of the valve to the waste receptacle 9.

Figure 8:
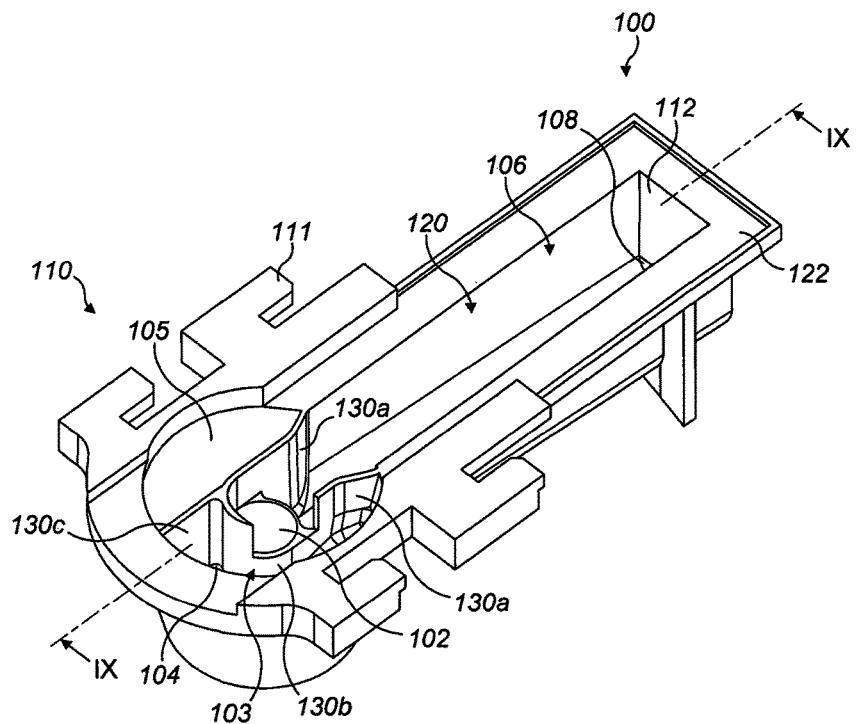
FIG. 8 is a perspective view of an outlet nozzle assembly according to a first embodiment of the present invention.
Figure 9:
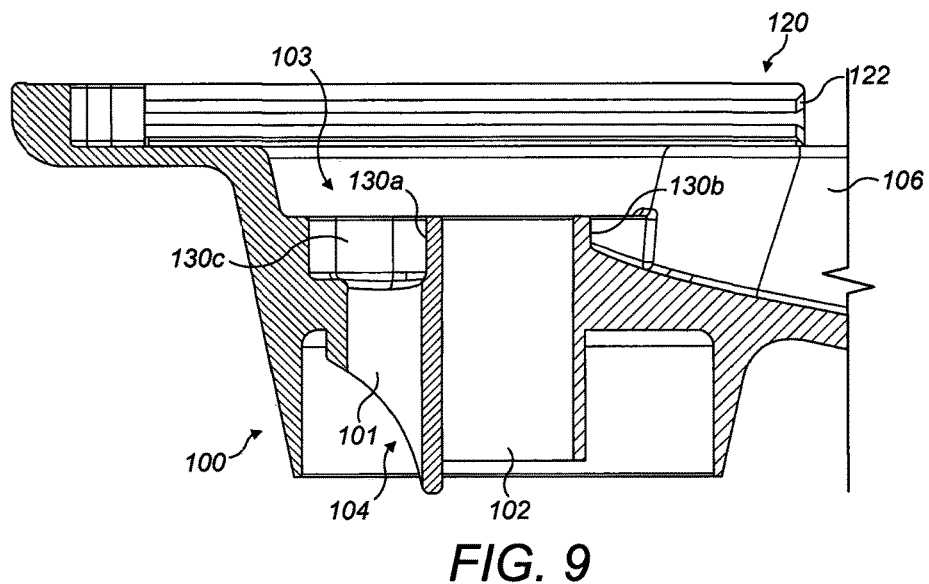
FIG. 9 is a section through part of the outlet nozzle assembly of FIG. 8, taken along line IX-IX.

The water delivery system to the cartridge comprises conduits that connect the tank 12, the water pump 14, the water heater 13 and the cartridge head 17 (as shown in FIG. 8) to transport the water from the tank 12 to the cartridge 19.

The cartridge holder 18 is designed to be capable of handling the opening forces generated by the pressure inside the cartridges 19, which is around 250 kg for espresso beverages. During operation of the machine 10 the cartridges 19 attempt to expand, but the integrity of the cartridges 19 must be maintained. In addition the user must not be able to open the holder 18 whilst the system is pressurised and suitable locking mechanisms are provided to achieve this.

One suitable design of cartridge head 17, as described in WO-A-2006/014936, is shown in FIGS. 4 to 7. The cartridge holder 18 of the cartridge head 17 comprises a fixed lower part 43, a rotatable upper part 44 and a pivotable cartridge mount 45 positioned between the fixed lower part 43 and the rotatable upper part 44. The upper part 44, lower part 43 and cartridge mount 45 are rotated about a common hinge axis 46. FIGS. 4 to 7 show the holder 18 with some components of the machine 10 omitted for clarity.

Figure 7:
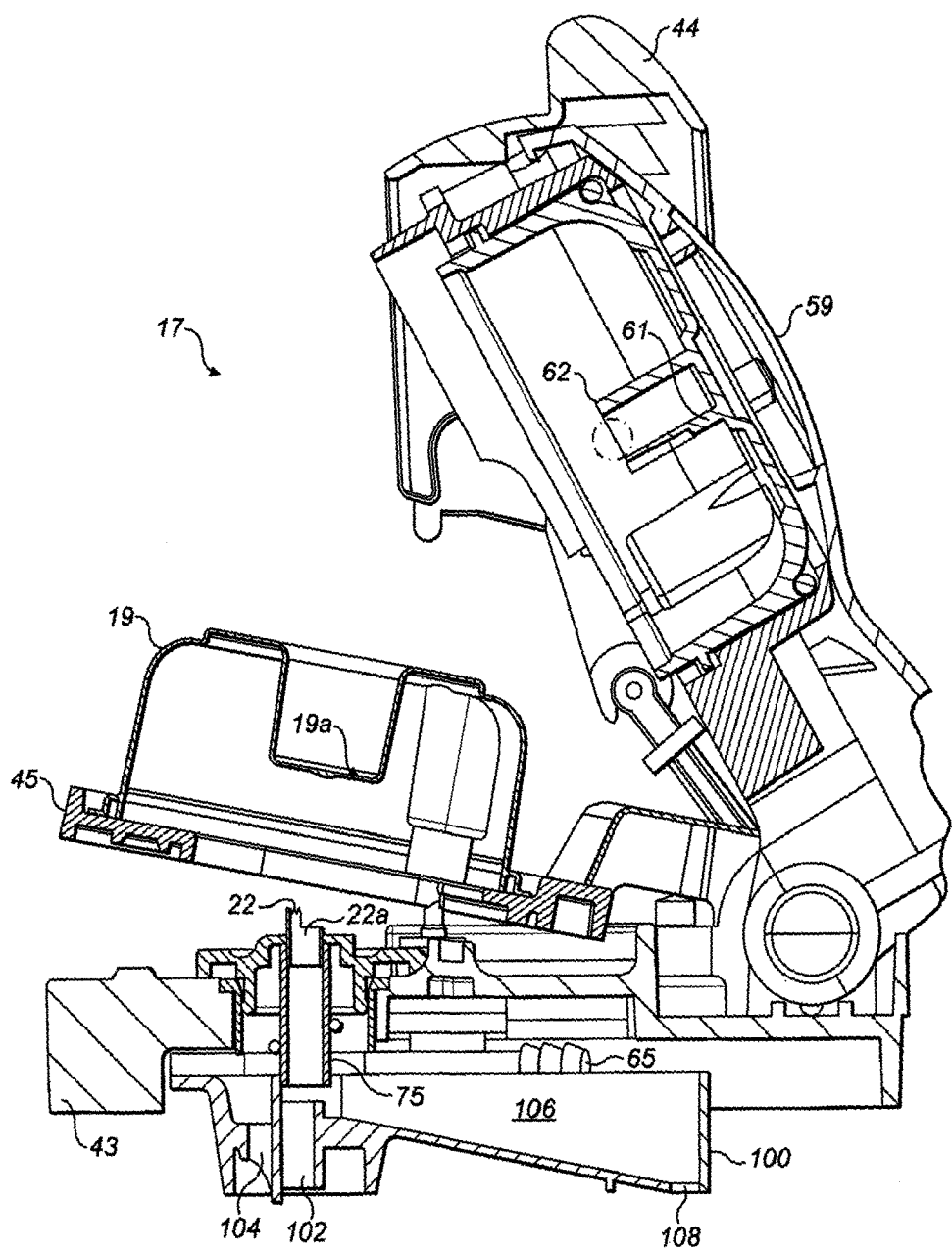
FIG. 7 is a cross-sectional side elevation of the cartridge head of FIG. 4 in an open position accommodating the beverage cartridge.

The cartridge mount 45 is provided with a substantially circular recess 55 which receives in use the beverage cartridge 19. The recess 55 includes an irregularity 56 for accommodating a handle portion of the beverage cartridge 19 which also acts to prevent rotation of the beverage cartridge 19 in the holder 18. The cartridge mount 45 is sprung relative to the fixed lower part 43 such that in the open position, as shown in FIG. 7, the cartridge mount 45 is biased out of contact with the fixed lower part 43. This causes the cartridge mount 45 to move out of contact with the outlet and inlet piercer members 21, 22. The cartridge mount 45 is provided with an aperture 57 for receiving the inlet and outlet piercers 21, 22 and a head of the cartridge recognition means 20 when the cartridge mount 45 is moved into the closed position.

Figure 6:
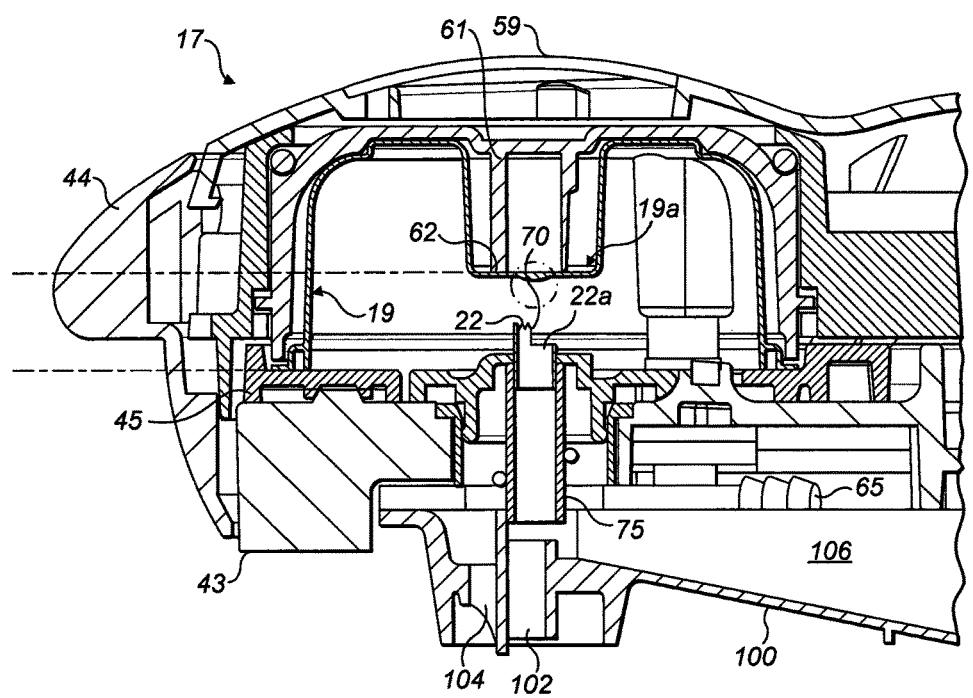
FIG. 6 is a cross-sectional view of the cartridge head of FIG. 4 in a closed position accommodating a beverage cartridge.

The upper part 43 comprises a generally circular body 58 housing a circular viewing window 59 through which a consumer can view the beverage cartridge 19 during a dispense cycle and can also confirm visually whether a cartridge 19 is loaded in the machine 10. The viewing window 59 is cup-shaped having a downwardly directed rim. In addition, the viewing window 59 is provided with a clamping member in the form of an inwardly directed tubular extension 61 as shown in FIG. 7. The extension 61 is directed towards the lower part 44 and lies within the volume of the cartridge head 17 when in the closed position as shown in FIG. 6. When the cartridge holder 18 is in the closed position, a distal end 62 of the tubular extension 61 of viewing window 59 bears against the clamping surface 19a of the beverage cartridge 19 biasing it against the lower part 44 as shown in FIG. 6 (in which the arrangement is illustrated containing a cartridge having a greater depth). The pressure exerted by the tubular extension 61 ensures a fluid tight seal between the cartridge 19 and the holder 18.

The lower part 43 comprises the inlet and outlet piercers 21, 22 and the head of the cartridge recognition means 20. The inlet piercer 21 comprises a hollow needle-like tube having a sharpened end for perforating a laminate of the beverage cartridge 19 in use. The inlet piercer 21 is in fluid communication with a water conduit 65, as shown in FIG. 7, which passes through the lower part 43 and is connected to an outlet conduit 66 of the water heater 13.

The outlet piercer 22 is similar in type to the outlet piercer described in the EP-A-0389141 and EP-A-0334572. An arcuate portion of the upper end of the outlet piercer 22 is serrated to pierce and eventually cut the laminate of the beverage cartridge 19. The remainder of the upper end of the outlet piercer 22 is cut back longitudinally of the cylinder at least to the base of the teeth of the serrated portion, to fold or pull the cut laminate away from the outlet aperture 70 before the beverage is dispensed therethrough.

Advantageously, the outlet piercer 22 is removable from the lower part 43 to enable it to be thoroughly cleaned, for example, in a dishwasher. The removable outlet piercer 22 is received in a recess in the lower part 43 where it is seated. The inlet piercer 21 and/or the outlet piercer 22 may be made of a metal, such as stainless steel, or from a plastics material. Preferably, the inlet piercer 21 and the outlet piercer 22 are formed as a single, integral unit which is removable from the lower part 43.

Figure 2:
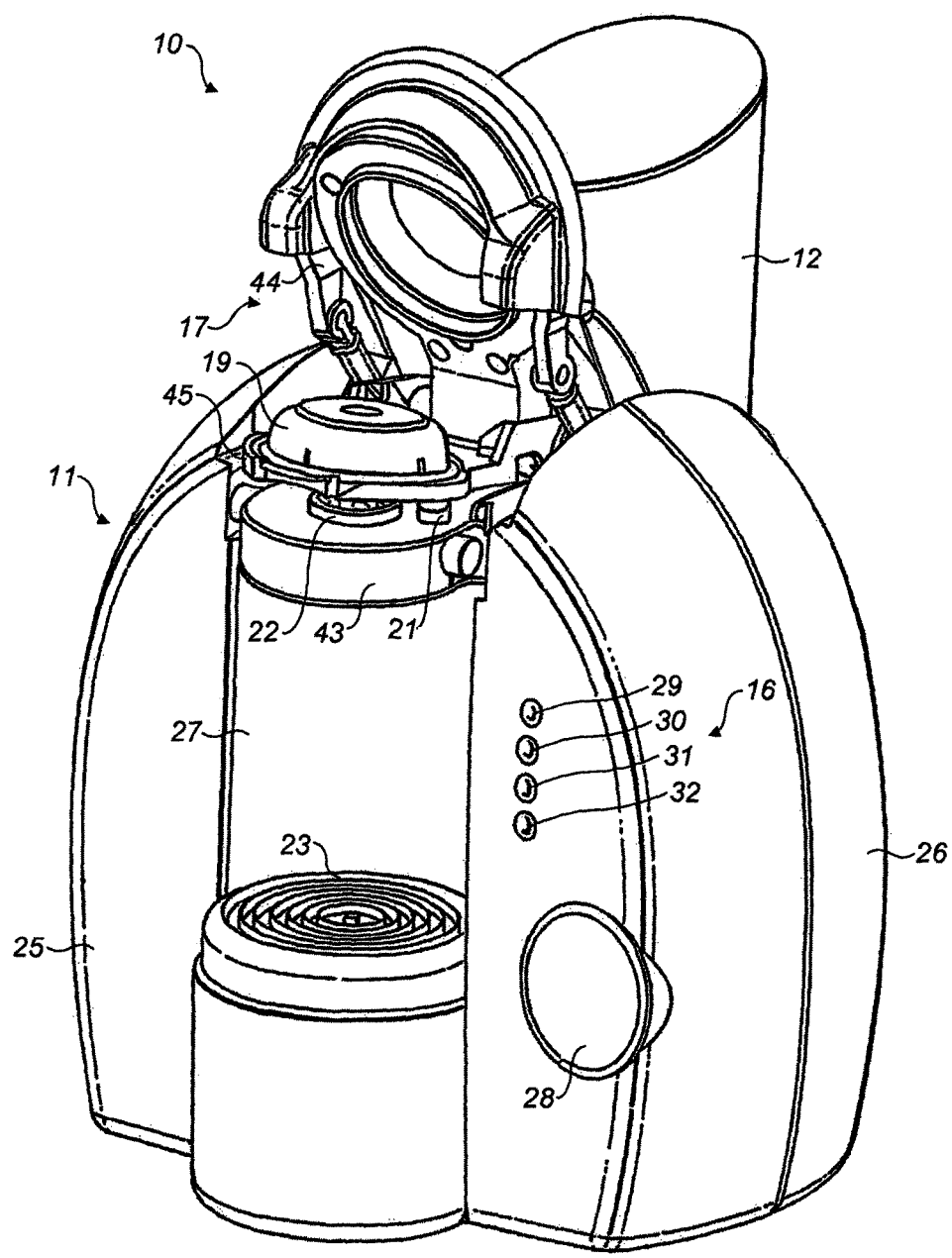
FIG. 2 is a front perspective view of the machine of FIG. 1 with the cartridge head in an open position.
Figure 3:
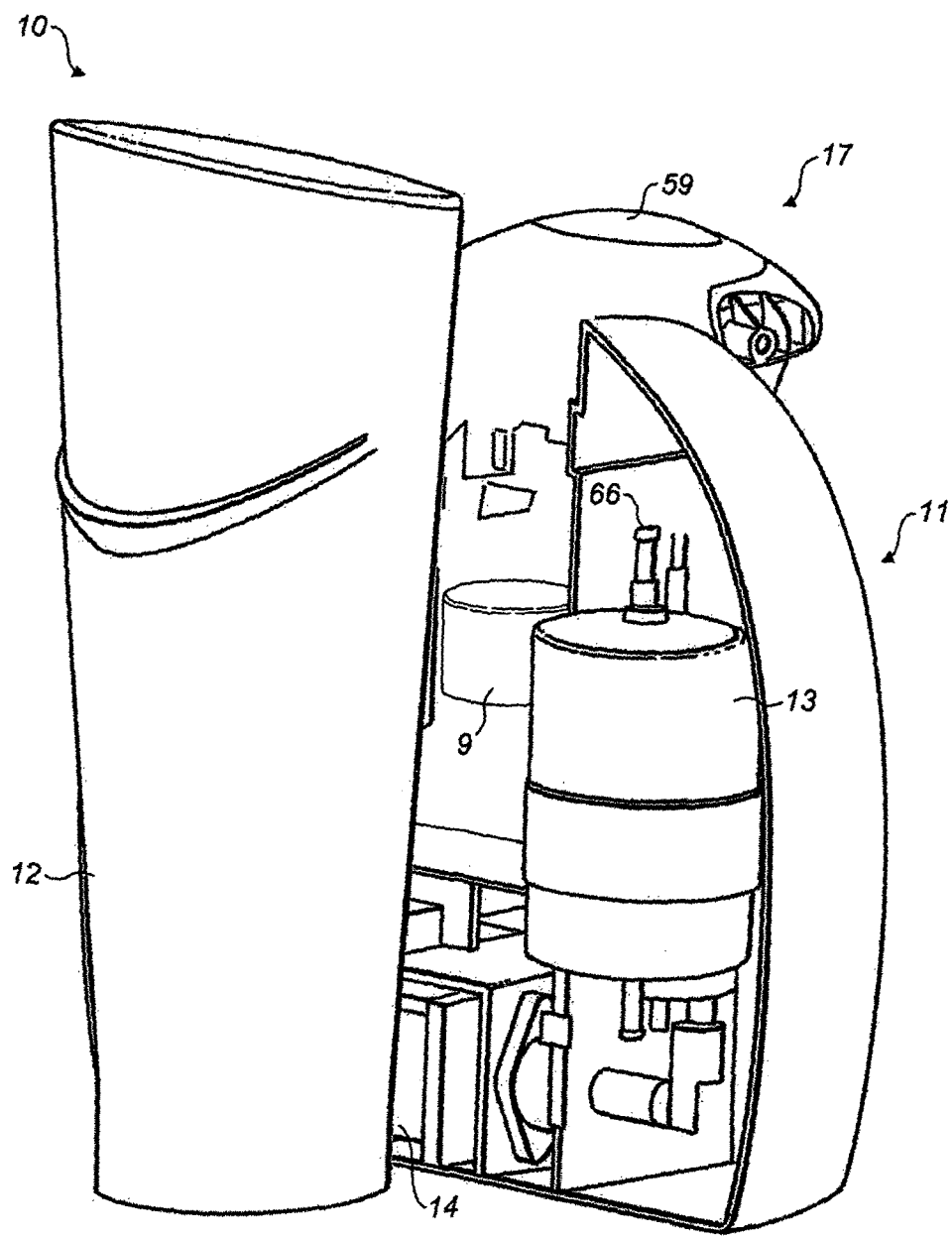
FIG. 3 is a rear elevation of the machine of FIG. 1 with some parts omitted for clarity.
Figure 4:
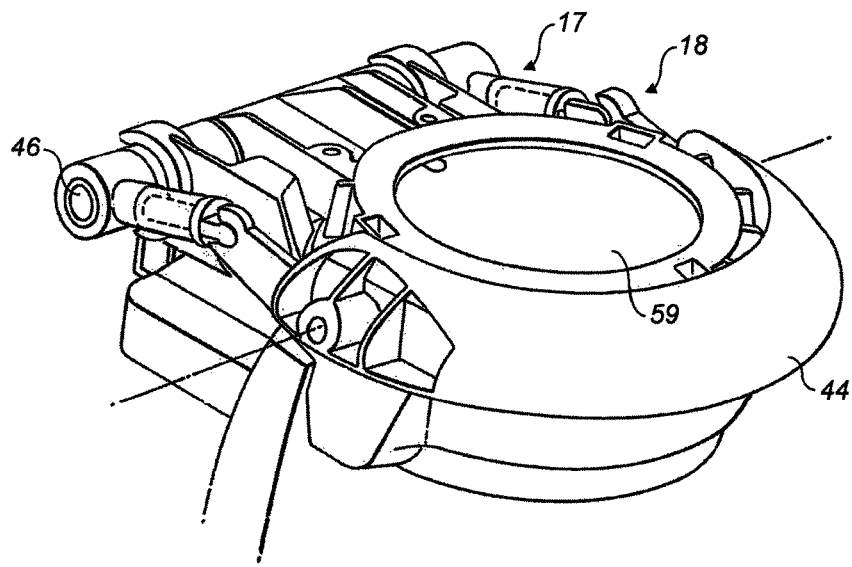
FIG. 4 is a front perspective view of a cartridge head of the machine of FIG. 1, with some parts omitted for clarity.
Figure 5:
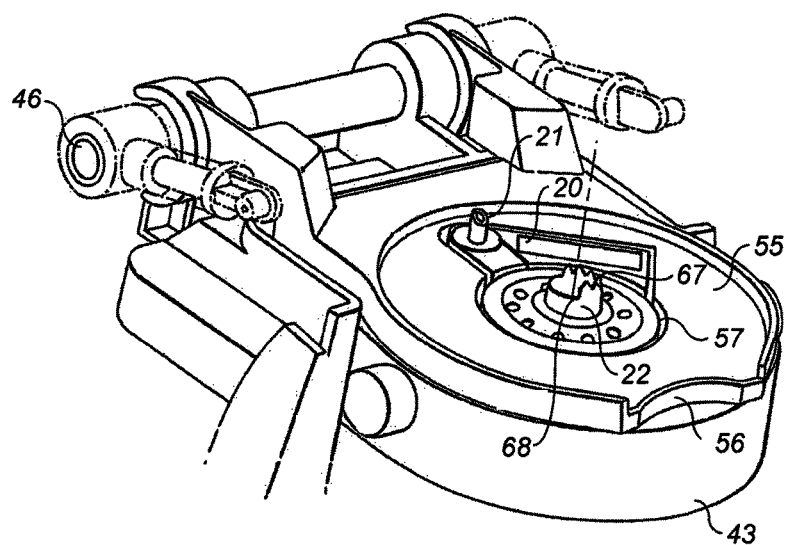
FIG. 5 is another front perspective view of the cartridge head of FIG. 4, with some parts omitted for clarity.

In use, the upper part 44 of the holder 18 is movable from an open position in which it is orientated vertically or towards the vertical as shown in FIG. 2, to a closed position in which it is orientated substantially horizontally and in inter-engagement with the fixed lower part 43 and cartridge mount 45. To close the upper part 44, a user takes hold of it and pulls downwards. Consequently, the upper part 44 rotates which first brings the tubular extension 61 of the viewing window 59 into contact with the clamping surface 19a of the beverage cartridge 19. Continued rotation of the upper part 44 rotates the upper part 44 and cartridge mount 45 down into contact with the lower part 43.

With the upper part 44 closed, the piercer 22 has formed the outlet through the laminate provided in the cartridge 19. The outlet piercer 22 has a hollow centre 22a that extends downwardly through the fixed lower part 43 to form an outlet 70. A flexible hose 75 is attached to the lower part of the outlet 70, as best seen in FIG. 7. The hose 75 conveys beverage dispensed from the cartridge 19 to the outlet nozzle assembly 100. The hose 75 is deflected to an appropriate part of the outlet nozzle assembly 100, namely either of a large delivery hole 102 or a small delivery hole 104 when dispensing beverage, or to a waste chute 106 during a steam purge. Details of the outlet nozzle assembly 100 and of deflection of the hose 75 is described in greater detail below.

Control of the dispense cycle is effected by the control processor of the beverage preparation machine 10, the central processor comprising a processing module and a memory. The control processor is operatively connected to, and controls operation of, the heater 13, pump 14, user interface 16, and other components described below.

The operational behaviour of the machine 10 is determined by software embedded in the control processor, for example as described in EP-A-1440644. The memory of the control processor includes one or more variables for one or more operational parameters for the beverage preparation machine 10. These are generally the temperature of the liquid passed through the beverage cartridge 19 during the operating stage, the speed of charging the beverage cartridge 19, the presence or otherwise of a soak step, the total dispensed volume of the beverage, the flow rate of the liquid during the discharge stage, and the period of the purge stage.

One purpose of the cartridge recognition means 20 is, inter alia, to allow the machine 10 to recognise the type of beverage cartridge 19 that has been inserted and to adjust one or more operational parameters accordingly. The variables for the operational parameters are stored in the memory. The cartridge 19 comprises a code provided on or in the cartridge 19 representing the operational parameters required for optimal dispensation of the beverage in that cartridge 19. An example of the code is described in EP-A-1440644.

The control processor memory further stores information on the type of beverage dispensed so that the operating cycle of the machine 10 may be adjusted for the next cartridge 19. This is especially advantageous where two or more beverage cartridges 19 are used sequentially to form a beverage. For example a coffee cartridge may be used, followed by a milk cartridge to form a cappuccino beverage. Alternatively a chocolate cartridge could be used followed by a milk cartridge to produce a creamy hot chocolate beverage. By using a memory that stores information on the first beverage dispensed, the manner of dispensing the second cartridge, say a milk cartridge, may be altered to achieve an optimum beverage. In the above example the milk dispensed for hot chocolate may, typically, be diluted less than the milk added to the coffee. In addition, the milk dispensed for chocolate may be dispensed at a slower flow rate to lessen the degree of foaming of the beverage. Many combinations of cartridges and operating parameters are possible as will be obvious to the skilled person. In addition, the memory may be used to allow the machine 10 to 'predict' the type of beverage that a user will next want to dispense. For example, if a user predominantly drinks one beverage type then the machine can instruct the water heater to remain at the optimum temperature for that beverage type.

Operation of machine 10 comprises insertion of a beverage cartridge 19 into the cartridge head 17, carrying out a dispense cycle in which the beverage is dispensed, and removal of the cartridge 19 from the machine.

To insert the cartridge 19, the cartridge holder 18 is opened as described above to expose the cartridge mount 45. The cartridge 19 is then placed on the cartridge mount 45 received within the recess 46. The cartridge holder 18 is then closed as described above. During closure the inlet and outlet piercers 21,22 pierce the cartridge 19 to form the cartridge inlet and outlet.

To commence the dispense cycle the user operates the start/stop button 28. The operating cycle comprises the steps of cartridge recognition and the beverage preparation cycle.

Cartridge recognition is performed by the optical cartridge recognition means 20 as described. Once the barcode has been decoded the operational parameters of the machine 10 are adjusted by the control processor. The preparation cycle is then automatically commenced. The preparation cycle has four main stages, although not all of these are used for all beverage types:

1. Pre-wet
2. Pause
3. Brew stage
4. Purge

In the pre-wet stage the cartridge 19 is charged with liquid from the storage tank 12 by means of the pump 14. The charging with water causes the beverage ingredients in the cartridge 19 to be wetted. The charging may take place, at a "fast" flow rate of 600 ml/min or a "slow" flow rate of 325 ml/min. The slow charging rate is particularly useful for cartridges 19 containing viscous liquid beverage ingredients where the ingredients require some dilution before they are able to be pumped at a higher volume flow rate. The volume of liquid injected into the cartridge 19 is selected to ensure that liquid or beverage does not drip out of the cartridge outlet during this stage.

The pause stage allows the beverage ingredients to soak in the liquid injected during the pre-wet stage for a predetermined period of time. Both the pre-wetting and soaking stages are known to increase the yield of the extractibles from the beverage ingredients and to improve the end flavour of the beverage. Pre-wetting and soaking are particularly used where the beverage ingredients are roast and ground coffee.

In the brew stage, liquid is passed through the cartridge 19 in order to produce the beverage from the beverage ingredients. The temperature of the liquid is determined by the control processor which sends instructions to the heater 13 to heat the liquid passing from the tank 12 to the cartridge head 17. Liquid enters the cartridge holder 18 via an inlet valve and the inlet piercer 21 and then passes into the beverage cartridge 19. Brewing and/or mixing of the beverage in the beverage cartridge 19 occurs, as described in EP-A-1440644, before the prepared beverage exits the cartridge 19, flows down the outlet 70, and through the hose 75, through either the large delivery hole 102 or the small delivery hole 104 of the outlet nozzle assembly 100, and then falls into a receptacle suitably placed in the dispensing station 27.

During the purge cycle, the temperature of the water heater 13 is raised sufficiently high to convert the water remaining in the system to steam and the pressurised steam is blown through the beverage preparation machine 10, the beverage cartridge 19, the outlet 70 and the hose 75. This ensures that all beverage is dispensed and that the flow path is cleared ready for dispensing another beverage. The purge cycle may not commence immediately on cessation of the brew/mixing stage to allow for the majority of the fluid to clear the flow path.

Once the operating cycle has been completed, the machine automatically, stops and the consumer removes the cartridge 19 by opening the cartridge holder 18 and manually removing and disposing of the cartridge 19. Alternatively, the machine 10 may be provided with an automatic ejection mechanism for removing the cartridge automatically on opening the cartridge holder 18.

An embodiment of an outlet nozzle assembly 100 of the present invention is shown in FIGS. 8 to 12. The outlet nozzle assembly 100 has an elongate body with an enlarged head 110. A large delivery hole 102 and a small delivery hole 104 are provided in the enlarged head 110. Two pairs of lugs 111 are provided to the edges of the outlet nozzle assembly 100. These lugs 111 co-operate with features provided in the machine 10 to allow the outlet nozzle assembly 100 to be held in position with the enlarged head 110 beneath the hose 75.

The outlet nozzle assembly 100 has a hollow interior 120 defined by side walls and framed by a top flange 122 of the outlet nozzle assembly 100. The majority of the interior 120 is formed as a trough-like waste chute 106. The waste chute 106 extends with a downward slope from the enlarged head 110 and has a waste hole 108 provided in its base where it meets the end wall 112 of the outlet nozzle assembly 100.

The interior 120 widens from having a rectangular plan view to a circular plan view where it meets the enlarged head 110. The centre of this circular plan view is occupied by the large delivery hole 102. The annular volume around the large delivery hole 102 is defined by upstanding walls 130. A first wall section 130a has a bell-shape such that it extends inwardly from either side of the waste chute 108 where it enters the enlarged head 110, before extending into the enlarged head 110 and around the large delivery hole 102. This wall section 130a extends the full height of the interior 120 except for a broken section 130b between the large delivery hole 102 and the small delivery hole 104. The broken wall section 130b extends from the base of the interior 120 to approximately half its height. A further wall section 130c extends from the side of the large delivery hole 102: this wall section 130c essentially continues the straight side edge of the bell-shaped wall section 130a to meet the side of the interior 120. Thus, the wall sections 130a-c define a chamber 103 and a space 105. The chamber 103 communicates with the small hole 104, and is provided with a sloping base to channel beverage to a small bore 101 of the small hole 104 that extends from the lowest point of the chamber's base, namely the junction between wall sections 130a and 130c. Thus, the chamber 103 may be used to control the flow of beverage to the small hole 104. The wall 130c is located to define a desired size of chamber 103: the space 105 also defined by the wall 130c is functionally redundant.

Figure 10:
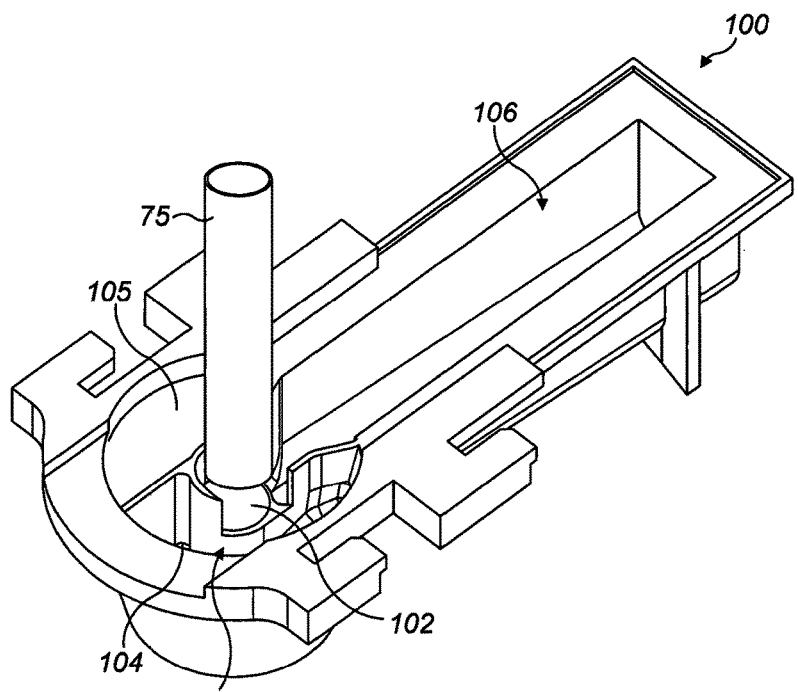
FIG. 10 is a perspective view of the outlet nozzle assembly of FIG. 8 and showing a nozzle in a first position for dispensing beverage through a wide bore delivery hole.
Figure 11:
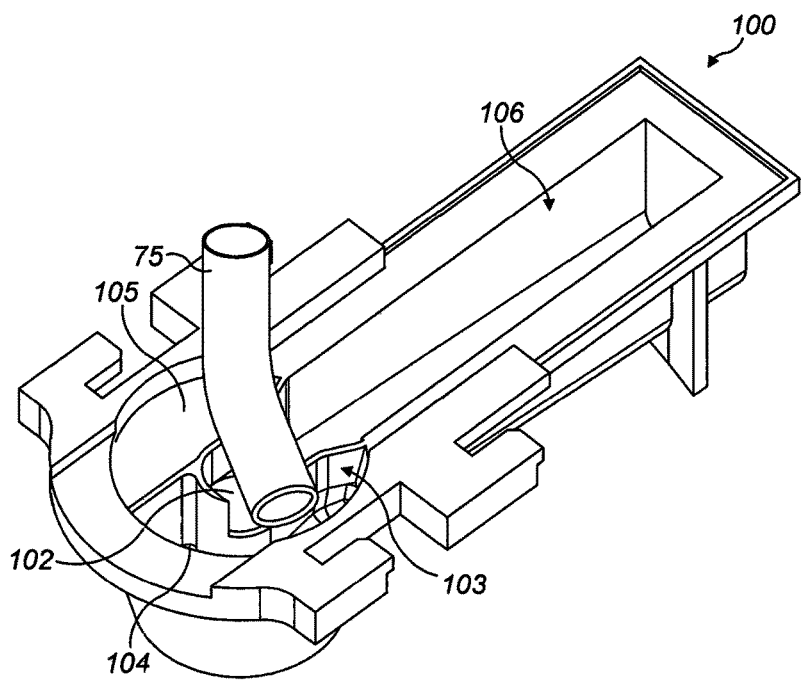
FIG. 11 is a perspective view of the outlet nozzle assembly of FIG. 8 and showing a nozzle in a second position for dispensing beverage through a wide bore delivery hole.
Figure 12:
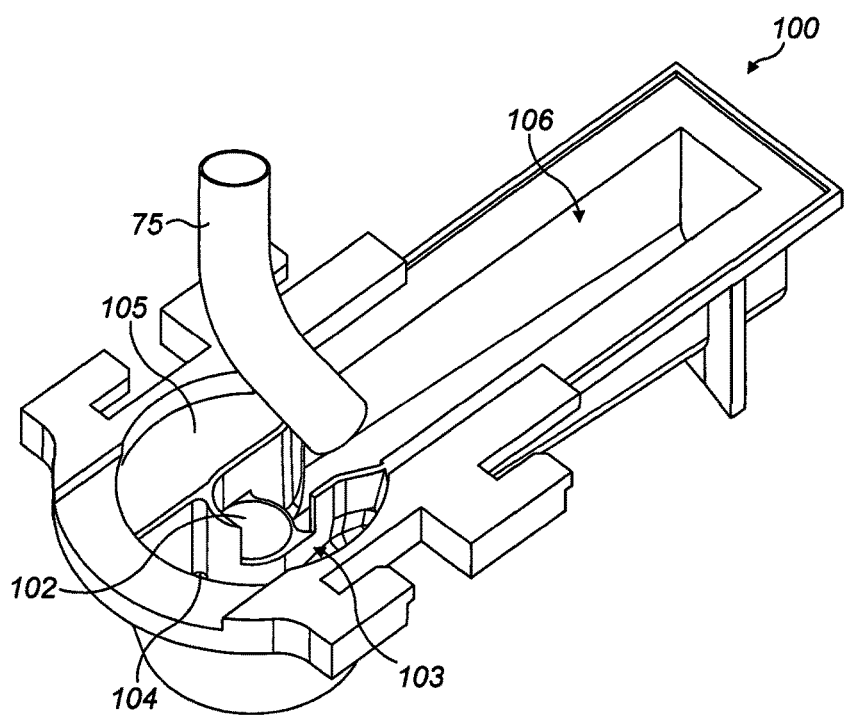
FIG. 12 is a perspective view of the nozzle outlet assembly of FIG. 8 and showing the nozzle in a third position aligned with a waste chute during a steam purge.
Figure 13:
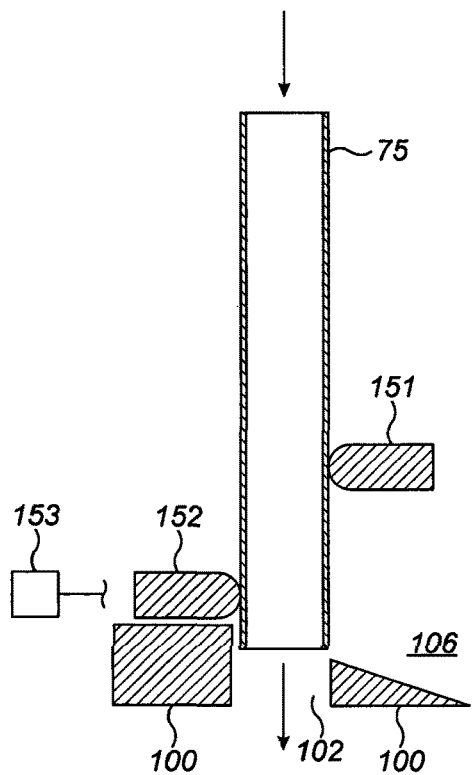
FIGS. 13 and 14 are schematic views of the nozzle and an actuator for moving the nozzle between the first position where the nozzle is aligned with the wide bore delivery hole and the third position where the nozzle is aligned with the waste chute.
Figure 14:
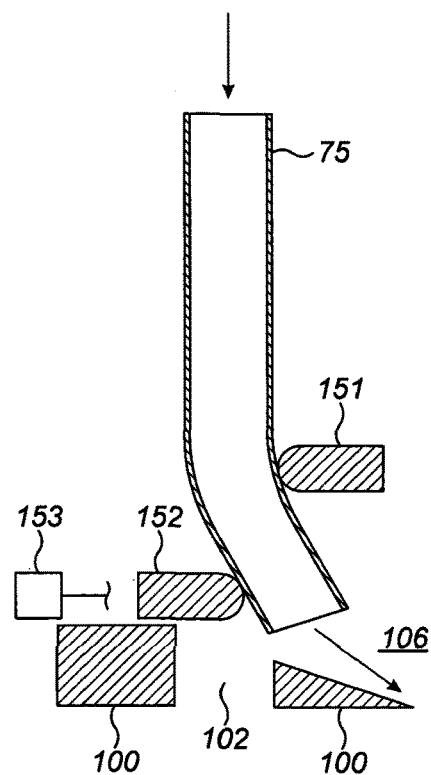

FIGS. 10 to 12 show the hose 75 in three delivery positions. The hose 75 is resilient such that it may be deflected to various delivery positions. It will be apparent to the skilled person that there are many ways of deflecting the outlet end of the hose 75. A simple schematic is shown in FIGS. 13 and 14 to illustrate one arrangement. A pair of fingers 151 and 152 are used as an actuator to deflect the resilient hose 75 from its relaxed position aligned with the large delivery hole 102 (see also FIG. 10) to an alignment with the waste chute 106 (see also FIG. 12).

The fingers 151 and 152 form an opposed, offset pair. Finger 151 is static, whereas finger 152 is driven by a motor 153. When finger 152 is driven, it moves to deflect the hose 75 towards the waste chute 106. The static finger 151 is positioned to contact the hose 75 at all times, such that the hose 75 bends against the static finger 151 as the driven finger 152 moves towards the waste chute 106. Hence, the outlet end of the hose 75 deflects to point towards the waste chute 106.

To position the hose 75 back over the large delivery hole 102, the driven finger 152 is merely retracted using the motor 103: the resilience of the hose 75 sees it return to its relaxed position aligned with the large delivery hole 102. A similar pair of fingers 151,152 may be used to deflect the hose 75 from the large delivery hole 102 into alignment with the chamber 103 of the small delivery hole 104. The hose 75 is not brought into direct alignment over the small hole 104 such that beverage flows into the chamber 103 where it pools and flows to the small bore 101. In this way, beverage is delivered through the small delivery hole 104. As will be clear from FIGS. 10 to 12, movement from the large delivery hole 102 to the small delivery hole 104 is substantially at right angles to movement from the large delivery hole 102 to the waste chute 106. FIGS. 10 to 12 also show that the outlet end of the nozzle 75 sits just within wall section 103a in its relaxed state. The broken wall section 103b between the large delivery hole 102 and the small delivery hole 104 is provided to allow the hose 75 to move between alignment with the large delivery hole 102 and the chamber 103 of the small delivery hole 104.

In use, a check of the position of the hose 75 is made when a user operates the beverage preparation machine 10 to prepare a beverage. The cartridge recognition means 20 determines the type of cartridge 19 being used, and the processor determines the desired delivery position of the hose 75 from the cartridge type and/or an indication of the beverage to be prepared provided by the user. For some beverages, the hose 75 may remain in its relaxed position aligned with the large delivery hole 102. Then, the beverage is prepared as described above, and is delivered down the hose 75 at relatively low pressure to pass through the large delivery hole 102. The beverage exits through the large delivery hole 102 to fall into a receptacle placed on the stand 23.

If the processor determines that the cartridge 19 requires delivery through the small delivery hole 104, for example because the user and/or the cartridge 19 indicates that an espresso is to be prepared, the processor commands an actuator (like motor 153/finger 152 combination) to move the outlet end of the hose 75 into alignment with the chamber 103 of the small delivery hole 104. Beverage is prepared as described previously, and flows down the hose 75 at relatively high pressure where it exits to flow into the chamber 103. The beverage then flows down the sloping chamber 103, and into and through the small bore 101. The beverage then falls into a receptacle placed on the cupstand 23. Once delivery of the beverage is complete, the hose 75 is allowed to return to alignment with the large delivery hole 102.

No matter the type of beverage delivered and the delivery hole 102 or 104 used, a steam purge is performed after delivery. The processor first causes the hose 75 to be moved into alignment with the waste chute 106. Steam is then generated and passed through the cartridge 19, the outlet 70 and the hose 75, as discussed previously. The condensed water and waste flows down the waste chute 106, through the waste hole 108 and into the waste receptacle 9. Once the steam purge is complete, the hose 75 is allowed to return to its relaxed position aligned with the large delivery hole 102.

Figure 15:
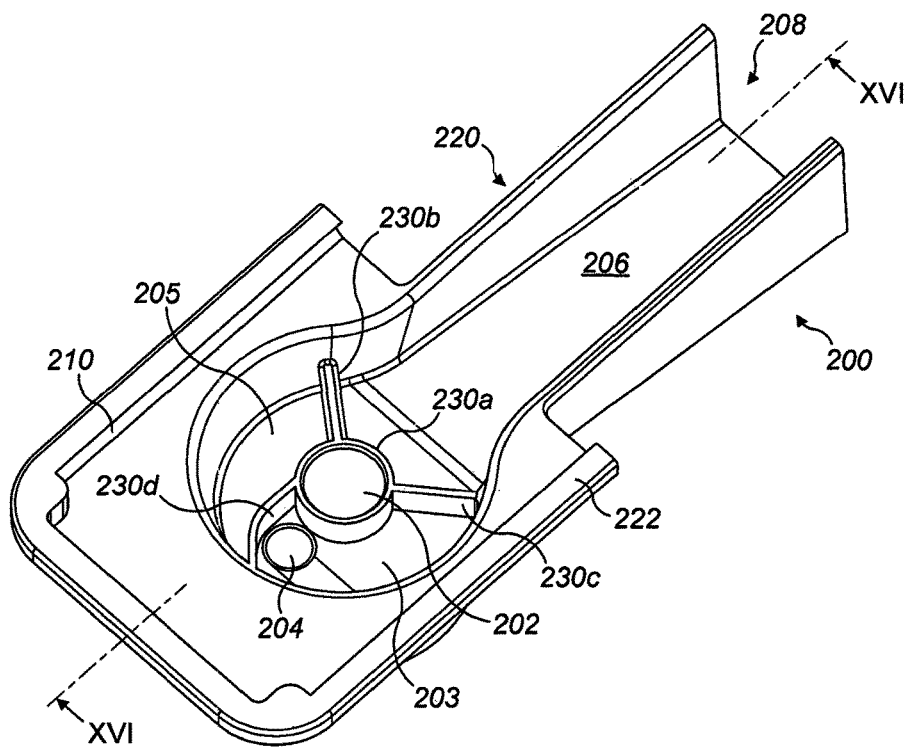
FIG. 15 is a perspective view of an outlet nozzle assembly according to a second embodiment of the present invention.
Figure 16:
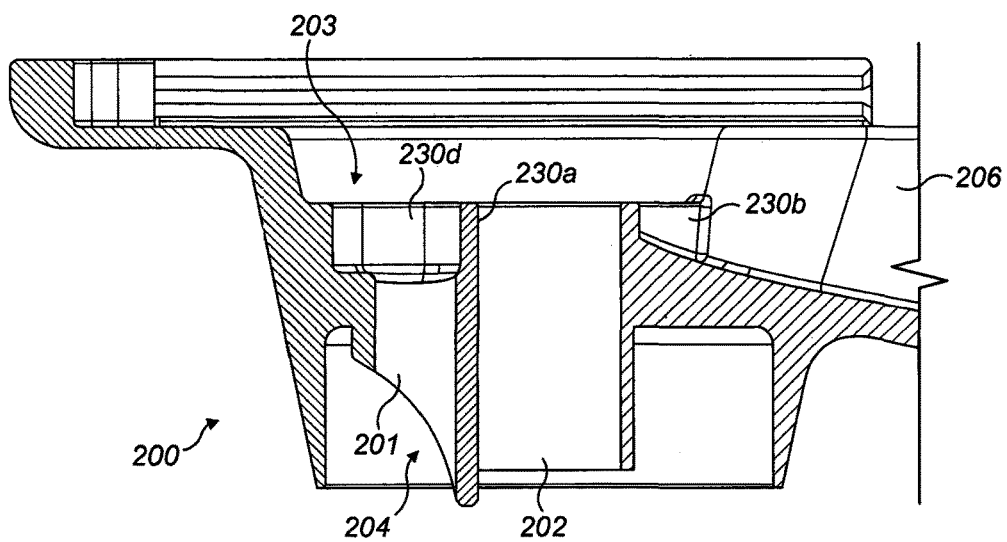
FIG. 16 is a section through part of the outlet nozzle assembly of FIG. 15, along line XVI-XVI.

An alternative design of outlet nozzle assembly 200 is shown in FIGS. 15 and 16. As many features are similar to the design of FIGS. 8-12, corresponding reference numerals are used for corresponding parts except incremented by 100. Hence, the large delivery hole changes from 102 to become 202.

The outlet nozzle assembly 200 of FIGS. 15 and 16 has a rectangular body and an enlarged head 210. The flange 222 extends around the enlarged head only. The hollow interior 220 is rectangular in plan view, changing to circular at the enlarged head 210. The rectangular part forms the waste chute 206, although is open ended without a side wall 112 to the outlet nozzle assembly 200. The waste hole 208 is provided by the missing side wall 112, with the waste chute 206 sloping down to the waste hole 208.

The large delivery hole 202 occupies the centre of the enlarged head 210. The top of the large delivery hole 202 is defined by the top of a circular, upstanding wall 230a. Three further upstanding walls 230b-d radiate outward from the circular wall 230a, substantially equally spaced 120° apart. Two of these walls 230b and 230c extend linearly to meet the side wall of the interior 220 where it curves to transition from the rectangular section to the circular section. The third wall 230d is curved and extends approximately in the longitudinal direction of the outlet nozzle assembly 200 before curving to meet the side wall of the interior 220. The walls 230a-d have the same height, and extend from the base of the interior 220 within the enlarged head 210 to around half the height of the side wall defining the interior 220 within the enlarged head 210. The walls 230c and 230d, along with part of circular wall 230a, define the chamber 203 of the small delivery hole 204. The small hole 201 extends from the base of the chamber 203, and is positioned next to the junction of the circular wall 230a and wall 230d. The chamber floor shapes towards the small bore 201. Space 205 is defined by walls 230b and d, and part of circular wall 230a.

The nozzle 75, in its relaxed state, ends just above the top of the circular wall 230a so that it is in alignment with the large delivery hole 202. The nozzle 75 may be deflected into alignment with the chamber 203 of the small delivery hole 204 or the waste chute 206, as has been previously described.

It will be evident to the person skilled in the art that modifications may be made to the embodiment described above without departing from the scope of the invention as defined by the appended claims.

For example, a waste chute 106;206 need not be included in the outlet nozzle assembly 100;200. Also, the number, relative sizes and positions of the delivery holes 102,104; 202,204 may be varied, within the requirement of having at least two delivery holes with different bore sizes. The shape of the delivery holes 102,104; 202,204 may be varied and may or may not be uniform along their depth. Moreover, the delivery holes 102,104; 202,204 need not extend to be parallel. For instance, the inlets to the delivery holes 102, 104;202,204 may be spaced apart while their outlets are closer together. This would allow the beverage to be dispensed from as close as a common position as possible, yet provide increased separation of their inlets to minimise the chances of cross-contamination.

The shape, width and position of the walls 130;230 may be varied. The general aim of these walls 130;230 is to provide a barrier between the large delivery hole 102;202, chamber 103;203 and waste chute 106;206. The waste chute 106;206 may be replaced by a simple waste hole, perhaps formed in the bottom of a second chamber like the chamber 103;203 provided for the small delivery hole 104;204. The small delivery hole 104;204 need not have a chamber 103;203.

The invention claimed is:

1. A beverage preparation machine configured to dispense a beverage through an outlet nozzle assembly, the machine comprising:
    an outlet nozzle assembly having provided therethrough a first outlet and a second outlet; and
    a single conduit arranged to deliver selectably fluid to the first outlet or the second outlet;
    wherein the conduit is arranged to move between a first position in which it is aligned to dispense fluid to the first outlet and a second position in which it is aligned to dispense fluid to the second outlet; and
    wherein the conduit is flexible and wherein the machine further comprises an actuator arranged to move the conduit from one of the first and second positions to the other of the first and second positions.

2. The beverage preparation machine of claim 1, wherein the first outlet is a first delivery hole for receiving beverage from one of the one or more conduits and delivering the beverage to a drinking receptacle such as a cup or mug, and wherein the second outlet is a waste outlet arranged to transfer waste to a waste receptacle.

3. The beverage preparation machine of claim 2, wherein the waste outlet comprises a chute arranged to guide the flow of waste down and to the side.

4. The beverage preparation machine of claim 3, wherein the chute terminates at a hole provided in the base of the chute or in the side of the outlet nozzle assembly.

5. The beverage machine of claim 1, wherein the first outlet is a first delivery hole for receiving beverage from one of the one or more conduits and delivering the beverage to a drinking receptacle such as a cup or mug, and the second outlet is a second delivery hole for receiving beverage from one of the one or more conduits and delivering the beverage to a drinking receptacle, the first delivery hole having a smaller bore than the second delivery hole.

6. The beverage preparation machine of claim 5, wherein the second delivery hole comprises a hole of a substantially constant bore and/or the first delivery hole comprises an enlarged entrance.

7. The beverage preparation machine of claim 6, wherein the enlarged entrance comprises a chamber, optionally arranged to capture beverage delivered by the conduit when the conduit is aligned with the chamber but offset from the first delivery hole.

8. The beverage preparation machine of claim 1, wherein the outlet nozzle assembly further comprises a third outlet and wherein the conduit is arranged to deliver selectably fluid to the first outlet, the second outlet or the third outlet.

9. The beverage preparation machine of claim 8, wherein the outlet nozzle assembly is arranged to move between a first position providing alignment for delivery of the fluid to the first outlet, a second position providing alignment for delivery of the fluid to the second outlet, and a third position providing alignment for delivery of the fluid to the third outlet.

10. The beverage preparation machine of claim 8, wherein the conduit is arranged to move between a first position in which it is aligned to dispense fluid to the first outlet, a second position in which it is aligned to dispense fluid to the second outlet, and a third position in which it is aligned to dispense fluid to the third outlet.

11. The beverage preparation machine of claim 10, wherein the actuator is arranged to move the conduit from one of the first, second or third positions to both of the others of the first, second and third positions.

12. The beverage machine of claim 8, wherein the first outlet is a first delivery hole for receiving beverage from one of the one or more conduits and delivering the beverage to a drinking receptacle, the second outlet is a second delivery hole for receiving beverage from one of the one or more conduits and delivering the beverage to a drinking receptacle, the first delivery hole having a smaller bore than the second delivery hole, and wherein the third outlet is a waste outlet arranged to transfer waste to a waste receptacle.

13. The beverage preparation machine of claim 8, wherein the waste outlet comprises a chute arranged to guide the flow of waste down and to the side.

14. The beverage preparation machine of claim 13, wherein the chute terminates at a hole provided in the base of the chute or in the side of the outlet nozzle assembly.

15. The beverage preparation machine of claim 12, wherein the second delivery hole comprises a hole of a substantially constant bore and/or the first delivery hole comprises an enlarged entrance.

16. The beverage preparation machine of claim 15, wherein the enlarged entrance comprises a chamber, optionally arranged to capture beverage delivered by the conduit when the conduit is aligned with the chamber but offset from the first delivery hole.

17. A system comprising the beverage preparation machine of claim 1 and a complementary cartridge containing one or more beverage ingredients wherein the machine is arranged to prepare beverages from the cartridge containing one or more beverage ingredients.

18. A method of dispensing beverages from a beverage preparation machine comprising an outlet nozzle assembly having provided therethrough a first outlet and a second outlet, and a single conduit arranged to deliver selectably beverage to the first or second outlet, the method comprising:
(a) passing fluid through the conduit that is aligned for delivering fluid to the first outlet; and
(b) passing fluid the conduit that is aligned for delivering fluid to the second outlet;
wherein the conduit is flexible and the machine further comprises an actuator, the method further comprising using the actuator to deflect the conduit such that it aligns for delivering fluid to the first outlet and/or the second outlet.

19. The method of claim 18, comprising:
prior to step (a), ensuring that the conduit is aligned for delivering fluid to the first outlet and, if not, causing relative movement between the first outlet and the conduit to bring them into alignment for delivering fluid to the first outlet; and
prior to step (b), ensuring that the conduit is aligned for delivering beverage to the second outlet and, if not, causing relative movement between the second outlet and the conduit to bring them into alignment for delivering beverage to the second outlet.

20. The method of claim 18, wherein the conduit is resilient and the method further comprises allowing the conduit to relax to its neutral position where it is aligned for delivering fluid to either the first or the second outlet.

21. The method of claim 18, wherein the first outlet is a first delivery hole and the second outlet is a waste outlet, and wherein:
step (a) comprises passing beverage through the conduit aligned for delivering beverage to the first delivery hole, thereby causing the beverage to be dispensed from the first delivery hole; and
step (b) comprises passing fluid, for example steam, through the conduit aligned for delivering fluid to the waste outlet.

22. The method of claim 18, wherein the first outlet is a first delivery hole and the second outlet is a second delivery hole, wherein the first delivery hole has a smaller bore than the second delivery hole, and wherein:
step (a) comprises passing beverage through the conduit aligned for delivering beverage to the first delivery hole at a relatively low flow rate, thereby causing the beverage to be dispensed from the first delivery hole; and
step (b) comprises passing beverage through the conduit aligned for delivering beverage to the second delivery hole at a relatively high flow rate, thereby causing the beverage to be dispensed from the second delivery hole.

23. The method of claim 22, wherein the outlet nozzle assembly further comprises a waste outlet, and the method further comprises passing a fluid, for example steam, through a conduit aligned for delivery to the waste outlet.

24. The method of claim 21, wherein the method comprises ensuring that the conduit is aligned for delivery to the waste outlet and, if not, causing relative movement between the waste outlet and the conduit to bring them into alignment for delivery; and passing a fluid through the conduit when it is aligned for delivery to the waste outlet.

* * * * *